US012270315B2

(12) United States Patent
Maar et al.

(10) Patent No.: US 12,270,315 B2
(45) Date of Patent: Apr. 8, 2025

(54) ROTOR BLADE FOR A TURBOMACHINE, ASSOCIATED TURBINE MODULE, AND USE THEREOF

(71) Applicant: MTU Aero Engines AG, Munich (DE)

(72) Inventors: Karl Maar, Munich (DE); Joerg Frischbier, Munich (DE); Hans-Peter Hackenberg, Munich (DE)

(73) Assignee: MTU AERO ENGINES AG, Munich (DE)

( * ) Notice: Subject to any disclaimer, the term of this patent is extended or adjusted under 35 U.S.C. 154(b) by 74 days.

(21) Appl. No.: 17/597,674

(22) PCT Filed: Jul. 14, 2020

(86) PCT No.: PCT/DE2020/000155

§ 371 (c)(1),
(2) Date: Jan. 18, 2022

(87) PCT Pub. No.: WO2021/013281

PCT Pub. Date: Jan. 28, 2021

(65) Prior Publication Data

US 2022/0259977 A1 Aug. 18, 2022

(30) Foreign Application Priority Data

Jul. 19, 2019 (DE) ........................ 102019210693.5

(51) Int. Cl.

| | |
|---|---|
| ***F01D 5/14*** | (2006.01) |
| ***F01D 5/28*** | (2006.01) |
| ***F04D 29/32*** | (2006.01) |

(52) U.S. Cl.

CPC ............. *F01D 5/141* (2013.01); *F01D 5/147* (2013.01); *F01D 5/288* (2013.01); *F04D 29/324* (2013.01);

(Continued)

(58) Field of Classification Search

CPC .......... F01D 5/141; F01D 5/145; F01D 5/147; F01D 5/16; F01D 5/12; F01D 5/14;

(Continued)

(56) References Cited

U.S. PATENT DOCUMENTS 4,012,172 A * 3/1977 Schwaar ............... F04D 29/324 416/223 R
4,682,935 A 7/1987 Martin (Continued)

FOREIGN PATENT DOCUMENTS

DE 102015103951 A1 10/2015
DE 102016124152 6/2017

(Continued)

*Primary Examiner* — Eric J Zamora Alvarez
(74) *Attorney, Agent, or Firm* — Hinckley, Allen & Snyder, LLP; David Josephs

(57) ABSTRACT

Rotor blade (20) to be arranged in a gas conduit (3) of a turbomachine (1), having a rotor blade airfoil (23), which radially inwardly has a chord length $S_i$, radially outwardly has a chord length $S_a$, and in a radial position $r_x$ inbetween has a chord length $S_x$, the chord length $S_x$ in the radial position $r_x$ being at least equal to the chord length $S_i$ radially inwardly ($S_i<S_x$), and the chord length $S_a$ radially outwardly corresponding at most 0.9 times the chord length $S_x$ in the radial position $r_x$ inbetween ($Sa<0.9\ S_x$).

20 Claims, 4 Drawing Sheets

(52) U.S. Cl.
CPC .... *F05D 2220/36* (2013.01); *F05D 2240/301* (2013.01); *F05D 2260/941* (2013.01)

(58) Field of Classification Search
CPC .......... F01D 5/148; F01D 5/225; F01D 5/282; F01D 5/288; F01D 9/02; F01D 9/041; F04D 29/324; F04D 29/384; F04D 29/386; F05D 2240/301; F05D 2220/36; F05D 2250/70; F05D 2250/71; F05D 2240/303; F05D 2250/713; F05D 2240/304; F05D 2250/20; F05D 2250/711; F05D 2250/712; F05D 2250/90; F05D 2260/941; F05D 2300/10
See application file for complete search history.

(56) References Cited

U.S. PATENT DOCUMENTS

| | | | | |
|---|---|---|---|---|
| 4,741,667 | A | 5/1988 | Price et al. | |
| 5,209,643 | A * | 5/1993 | Cole | B64C 11/18<br>416/223 R |
| 5,448,828 | A | 9/1995 | Willems et al. | |
| 5,785,498 | A | 7/1998 | Quinn et al. | |
| 6,328,533 | B1 | 12/2001 | Decker et al. | |
| 9,599,064 | B2 * | 3/2017 | Gallagher | F02C 3/04 |
| 10,184,483 | B2 | 1/2019 | Gallagher et al. | |
| 2006/0018760 | A1 * | 1/2006 | Bruce | C23C 28/321<br>416/229 A |
| 2009/0257866 | A1 | 10/2009 | Greim et al. | |
| 2014/0072715 | A1 * | 3/2014 | Jones | F01D 5/288<br>427/367 |
| 2015/0275675 | A1 | 10/2015 | Ristan et al. | |
| 2015/0354362 | A1 | 12/2015 | Gallagher et al. | |
| 2017/0175529 | A1 | 6/2017 | Chouhan et al. | |
| 2018/0179900 | A1 | 6/2018 | Tham et al. | |
| 2020/0200033 | A1 * | 6/2020 | Kitagawa | F01D 11/127 |

FOREIGN PATENT DOCUMENTS

| | | | |
|---|---|---|---|
| EP | 0251978 | A2 | 1/1988 |
| EP | 0618310 | A2 | 10/1994 |
| EP | 1582695 | A1 | 10/2005 |
| WO | 2007113149 | A1 | 10/2007 |
| WO | 2015126824 | A1 | 8/2015 |
| WO | 2017003416 | A1 | 1/2017 |

* cited by examiner $0{,}9\ S_x \leq S_i \leq S_x$

ROTOR BLADE FOR A TURBOMACHINE, ASSOCIATED TURBINE MODULE, AND USE THEREOF

TECHNICAL FIELD

The present invention relates to a rotor blade for a turbomachine.

PRIOR ART

The turbomachine may be, for example, a jet engine, for example a turbofan engine. Functionally, the turbomachine is divided into a compressor, a combustion chamber and a turbine. In the case of the jet engine, for instance, induced air is compressed by the compressor and burned with added kerosene in the downstream combustion chamber. The resulting hot gas, a mixture of combustion gas and air, flows through the downstream turbine and is expanded in the process. The turbine is generally composed of a plurality of stages, each having a stator (guide vane ring) and a rotor (rotor blade ring), and the rotors are driven by the hot gas. In each stage, internal energy is extracted proportionately from the hot gas and converted into a movement of the respective rotor blade ring and thus of the shaft.

The present subject matter relates to a rotor blade for arrangement in the gas duct of the turbomachine. The rotor blade can generally also be used in the compressor region, that is to say it can be arranged in the compressor gas duct; use in the turbine region is preferred, that is to say it is placed in the hot-gas duct.

The present invention is based on the technical problem of specifying a particularly advantageous rotor blade.

SUMMARY OF THE INVENTION

The present invention provides a rotor blade which radially inwardly has a chord length $S_i$ and radially outwardly has a chord length $S_a$, and radially inbetween, in a radial position $r_x$, has a chord length $S_x$. In this case, the chord length decreases radially outwardly ($S_i \leq S_x$), on the one hand, but does not have such a progression over the entire rotor blade airfoil height, on the other hand. Specifically, the chord length either remains constant radially inwardly from the radial position $r_x$, or it even decreases ($S_i \leq S_x$). In summary, this results initially in a constant or slightly increasing chord length from radially inside to radially outside in a radially inner section, and the chord length then decreases in a radially outer section.

The smaller chord length $S_a$ radially outwardly can be advantageous, for example, to the extent that the edge load can thus be reduced, that is to say, in simplified terms, the mass which pulls outwardly as a result of the rotation. It is thereby possible to reduce centrifugal stresses in the radially outer section, which can increase the robustness or impact tolerance of the airfoil. Since the airfoil material is less stressed, only an impact of higher energy leads to critical material damage. On the other hand, however, the inventors have also observed that the frequency of impacts and the impact load resulting from the speed and mass are not uniformly distributed radially. Specifically, the load is lower radially on the inside, and therefore, conversely, a higher stress level is acceptable there (because there are fewer particle impacts with, in addition, a lower speed on the inside than on the outside).

This is utilized with the chord length, which, according to the main claim, is constant in the radially inner section or even decreases toward the inside. When considered overall, it is thereby possible to avoid particularly large axial lengths, despite an increased impact tolerance of the airfoil. This can be advantageous, for example, with regard to the weight and the space requirement; for example, the corresponding turbine module can also be of more compact construction axially. In summary, the increased robustness does not come at the expense of efficiency, at least not significantly.

Preferred embodiments can be found in the dependent claims and the entire disclosure, wherein in the representation of the features a distinction is not always made specifically between aspects relating to the device, to the method or to the use; at any rate, the disclosure should implicitly be read as relating to all categories of claims. If, for example, the advantages of the rotor blade are described in a specific use, this should be read as a disclosure both of the correspondingly designed rotor blade and of such a use.

The indications “axial”, “radial” and “circumferential”, as well as the associated directions (axial direction, etc.) relate to the axis of rotation about which the rotor blade rotates during operation. This typically coincides with a longitudinal axis of the engine or engine module. As explained in detail below, the rotor blade is preferably used in a high-speed turbine module, where the increase in impact tolerance achieved by means of the design can make it possible, for example, to use materials which are resistant to high temperatures while therefore being comparatively brittle in many cases, however.

The chord length is in each case considered in a tangential section through the airfoil, that is to say tangentially at the corresponding radial height (e.g. radially inwardly or outwardly or in between). In detail, the length is then taken along a connecting tangent which, in the section, is placed against the pressure side of the profile and which does not intersect the airfoil and has two points of contact with the airfoil (in the region of the leading edge and in the region of the trailing edge). The chord length is then obtained along this connecting tangent as the distance between a front tangent and a rear tangent, wherein the front tangent and the rear tangent each lie perpendicular to the connecting tangent and touch (and do not intersect) the airfoil at the front (front tangent) and at the rear (rear tangent).

The chord length $S_i$ radially inwardly is taken in a tangential section directly above the blade root or inner shroud, and the outer chord length $S_a$ directly below the outer shroud. In relation to a rotor blade airfoil height taken from radially inside to radially outside, the chord length $S_i$ is taken radially inwardly at 0% and the chord length $S_a$ is taken radially outwardly at 100% of the rotor blade airfoil height, wherein in particular what is referred to as a “fillet”, i.e. a material transition from the airfoil to the respective shroud in the form of a radius of curvature, is not taken into account. That is to say that the chord lengths $S_a$ and $S_i$ are, in particular, either “taken” without a fillet and correspond in this case to the respective extrapolated chord length, which is extrapolated linearly from directly below or directly above the respective fillet to 0% or to 100% of the rotor blade airfoil height. Alternatively, the chord lengths $S_a$ and $S_i$ can be taken at a point adjoining and directly radially below or above the fillet. In the present disclosure, the chord lengths $S_a$ and $S_i$ can each comprise a chord length which is determined in one or the other of these two ways.

In a preferred embodiment, the radial position $r_x$ with the chord length $S_x$ is at least 20% and at most 50% of the rotor blade airfoil height taken radially from the inside to the outside. This positioning allows particularly good adaptation to the radial distribution of the impact load observed by the inventors.

In some embodiments, the radial range of a radially inner and/or outer fillet can be in the range of 2% to 5%, in the range of 2.5% to 4%, or in the range of 3% to 3.5%.

According to a preferred embodiment, the chord length $S_i$ radially inwardly corresponds to at least 0.9 times the chord length $S_x$ in the radial position $r_x$ inbetween ($S_i \geq 0.9\ S_x$). In simplified terms, the chord length is therefore intended to decrease radially inwardly at most slightly (in comparison with the decrease radially outwardly).

In a preferred embodiment, the chord length $S_a$ radially outwardly corresponds to at least 0.7 times the chord length $S_x$ in the radial position $r_x$. The chord length $S_a$ radially outwardly is thus preferably in an interval of 0.7 $S_x$ to 0.9 $S_x$ ($0.7\ S_x \leq S_a \leq 0.9\ S_x$).

The following embodiments relate to the radial progression of the chord length, i.e. the chord length is considered as a function of the radius, S(r). The starting point here is in each case the radial position $r_x$ inbetween, and from there, on the one hand, the radially outward progression is considered, that is to say from $S_x$ to $S_a$. On the other hand, from there, the progression is considered radially inwardly, that is to say from $S_x$ to $S_i$.

A monotonic decrease is preferred in each case, that is to say there are in each case no values greater than $S_x$ from $S_x$ to $S_a$ (radially outer section) and/or from $S_x$ to $S_i$ (radially inner section). In other words, the chord length S from the radial position $r_x$ with $S_x$ remains constant at most in sections radially outwardly and/or radially inwardly or decreases, but does not increase. $S_x$ thus corresponds to the maximum chord length of the rotor blade airfoil.

The chord length in the radially outer section from $S_x$ to $S_a$ preferably decreases strictly monotonically and/or decreases strictly monotonically in the radially inner section from $S_x$ to $S_i$. In other words, the chord length does not remain constant over several radial positions.

According to a preferred embodiment, the slope is constant in this case, i.e. the chord length decreases radially outwardly (in the radially outer section) and/or radially inwardly (in the radially inner section) with a linear progression. The slopes in the radially inner and the radially outer section can certainly differ, and it is preferably greater in the radially outer section.

According to an alternatively preferred embodiment, the decrease in the chord length becomes greater radially outwardly (in the radially outer section) and/or radially inwardly (in the radially inner section) away from the radial position $r_x$. The slope dS/dr thus increases outwardly or inwardly away from the radial position $r_x$. If the airfoil is considered as a whole, such a progression can also be combined with a linear progression, i.e. the chord length can, for example, decrease outwardly with increasing slope in the radially outer section, but can have a constant slope in the radially inner section, or vice versa (radially outwardly constant, inwardly increasing).

According to a preferred embodiment, the rotor blade airfoil slopes toward the suction side, at least in some section or sections. In this context, this slope is set in such a way that the moment of the centrifugal force resulting during operation is greater than that of the gas force, i.e. the latter is overcompensated. The centrifugal-force bending moment acting on the rotor blade airfoil is thus greater than the gas-force bending moment; in simplified terms, the rotor blade airfoil is bent toward the pressure side during operation, driven by centrifugal force. This increases the load on the suction side, whereas it decreases on the pressure side and at the leading and trailing edges. As a result of the deliberate prestressing of the rotor blade airfoil, the relative stress on the pressure side and, because of the profile curvature, also at the leading edge can be reduced during operation, increasing impact tolerance, that is to say resistance to foreign-particle impact. On account of the load relief at the leading edge, because the rotor blade material is less stressed there during operation (the relative stress can be reduced by up to 20%, for example), only an impact of relatively high energy leads to critical material damage.

A radially variable slope of the rotor blade airfoil may be preferred. This can, for example, be more sharply inclined between 20% and 60% of the rotor blade airfoil height (taken from radially inside to outside) than radially inside it (between 0% and 20%) and/or radially outside it (between 60% and 100%). Preferably, a progression of the slope can be such that it initially increases from radially inside to radially outside, then reaches a maximum between 20% and 60% of the rotor blade airfoil height and then decreases again radially outwardly. With the radially variable slope, critical areas can be relieved in a selective manner with regard to the risk of impact.

According to a preferred embodiment, the outer shroud of the rotor blade is embodied with only a single sealing fin. During operation, this sealing fin, also referred to as a sealing tip, can interact with a sealing structure that faces radially inward and that is at rest relative to the housing. The sealing fin can run into the sealing structure, for example a honeycomb structure, for a short distance, and this can then result overall in good sealing in the axial direction. With regard to the sealing effect, the restriction to a single sealing fin can mean a certain disadvantage, but the associated weight reduction may be advantageous owing to the reduced edge load, cf. the above comments. For illustration, if the weight of the outer shroud is reduced, e.g. to a maximum of 7 g per rotor blade, a static mean stress of at most 150 MPa can thus be set, for example, in all the profile sections of the blade profile.

According to a preferred embodiment, the rotor blade airfoil is made of a high-temperature-resistant material. "High-temperature-resistant" can imply, for example, suitability for temperatures up to at least 700° C. or even 800° C., and such a high-temperature resistance usually goes hand in hand with lower ductility. This results in a higher susceptibility to impact, which is counteracted with the measure(s) described here. At the same time, modifications of the microstructure are also possible in order to increase the ductility of the brittle material.

The high-temperature-resistant material may, in particular, be titanium aluminide, preferably an intermetallic TiAl material or a TiAl alloy. In the context of the present invention, these are understood as meaning materials which have titanium and aluminum as the main constituents, as well as intermetallic phases, e.g. $Ti3Al$, γ-TiAl. In particular, the airfoil or blade can be made from a TNM alloy (titanium, niobium, molybdenum, e.g. 43.5 at. % Al, 4 at. % Nb, 1 at. % Mo and 0.1 at. % boron, the rest being formed by titanium or unavoidable impurities).

The rotor blade airfoil, preferably the rotor blade as a whole, can be produced, for example, by casting, forging and/or generative manufacture and final contour milling (in particular from the high-temperature-resistant material). In addition to the rotor blade airfoil and the aforementioned outer shroud, the rotor blade can, for example, have a rotor blade root, which can be mounted in a rotor disk. The rotor blade can also be combined with one or more further rotor blades to form an integral multiple segment, and it can likewise be part of a blisk (blade integrated disk).

In a preferred embodiment, the rotor blade airfoil is provided with a coating at least at the leading edge. The coating can locally cover the leading edge and, optionally, the trailing edge, but the rotor blade airfoil can also be completely coated (full armoring).

In a preferred embodiment, the coating is embodied as a multilayer system, that is to say it is built up from at least two layers laid one on top of the other. The combination of a brittle and a ductile layer may be advantageous, the ductile material preferably being arranged on the inside and the brittle material being arranged thereon. The brittle material may crack in the event of an impact, consuming part of the impact energy. With the ductile material underneath, which is preferably applied directly to the rotor blade airfoil, crack growth into the blade material can be prevented (the crack nuclei lie in the brittle material). In a preferred embodiment, the brittle material is a ceramic material and/or the ductile material is a metallic material.

In a preferred embodiment, the rotor blade is designed for a high-speed rotor, in particular a high-speed turbine module. In this context, values of $An^2$ of at least 2000 $m^2/s^2$ are considered to be "high-speed", being increasingly preferred in the order in which they are mentioned: at least 2500 $m^2/s^2$, 3000 $m^2/s^2$, 3500 $m^2/s^2$, 4000 $m^2/s^2$, 4500 $m^2/s^2$ or 5000 $m^2/s^2$ (possible upper limits can be, for example, at a maximum of 9000 $m^2/s^2$, 7000 $m^2/s^2$ or 6000 $m^2/s^2$). In the case of a conventional rotor blade which is not designed for high-speed operation, $An^2$ can be, for example, around 1800 $m^2/s^2$. In general, $An^2$ can be obtained using the annulus area, in particular at the outlet, multiplied by the rotational speed in the ADP range squared. The aerodynamic design point (ADP) is obtained at cruising altitude under cruise conditions, being distinguished by ideal incident flow conditions and the best efficiency and thus lowest consumption. If, as an alternative, reference is made to the speed of revolution at the blade tip (radially on the outside), this can, in the case of a conventional rotor blade, for example, be up to a maximum of 220 m/s, but in the case of a high-speed rotor blade it can be more than 300 m/s or even 400 m/s.

The invention also relates to a turbine module for an aircraft engine, in particular a geared turbofan engine, having a rotor blade which is disclosed herein. In this case, the turbine module can be designed, in particular, for "high-speed" operation of the rotor blade, cf. the information in the previous paragraph. Owing to the coupling via the transmission, the turbine module can rotate faster than the fan of the aircraft engine during operation (this means "high-speed"). The turbine module may be, for example, a low-pressure turbine module.

The turbine module can preferably be designed in such a way that the outer shroud of the rotor blade is cooled during operation by a cooling fluid which is not passed through the rotor blade itself. The cooling fluid, for example compressor air, can, for example, be guided from radially inside to radially outside by a guide vane mounted in front of the rotor blade and can thus be brought to the outer shroud of the rotor blade. The temperature reduction associated with the cooling of the outer shroud can be advantageous, for example, inasmuch as possible shroud creep or blade profile creep can be reduced. Conversely, this can increase the latitude in the case of a modification of the microstructure of the blade material, that is to say, despite the high-temperature-resistant design, it can permit a material with somewhat increased ductility. Generally, a combination of the measures described here can be advantageous insofar as together they can raise a critical impact energy above the requirement profile that is relevant in practice.

The invention also relates to the use of a rotor blade which is disclosed herein or of a turbine module, wherein the rotor blade rotates with an $An^2$ of at least 2000 $m^2/s^2$, and attention is drawn to the above information.

BRIEF DESCRIPTION OF THE DRAWINGS

The invention is explained in greater detail below with reference to an exemplary embodiment, although, within the scope of the additional independent claims, the individual features may also be essential to the invention in some other combination, and, in this case too, no distinction is drawn specifically between the various categories of claims.

More particularly.

PREFERRED EMBODIMENT OF THE INVENTION

Figure 1:
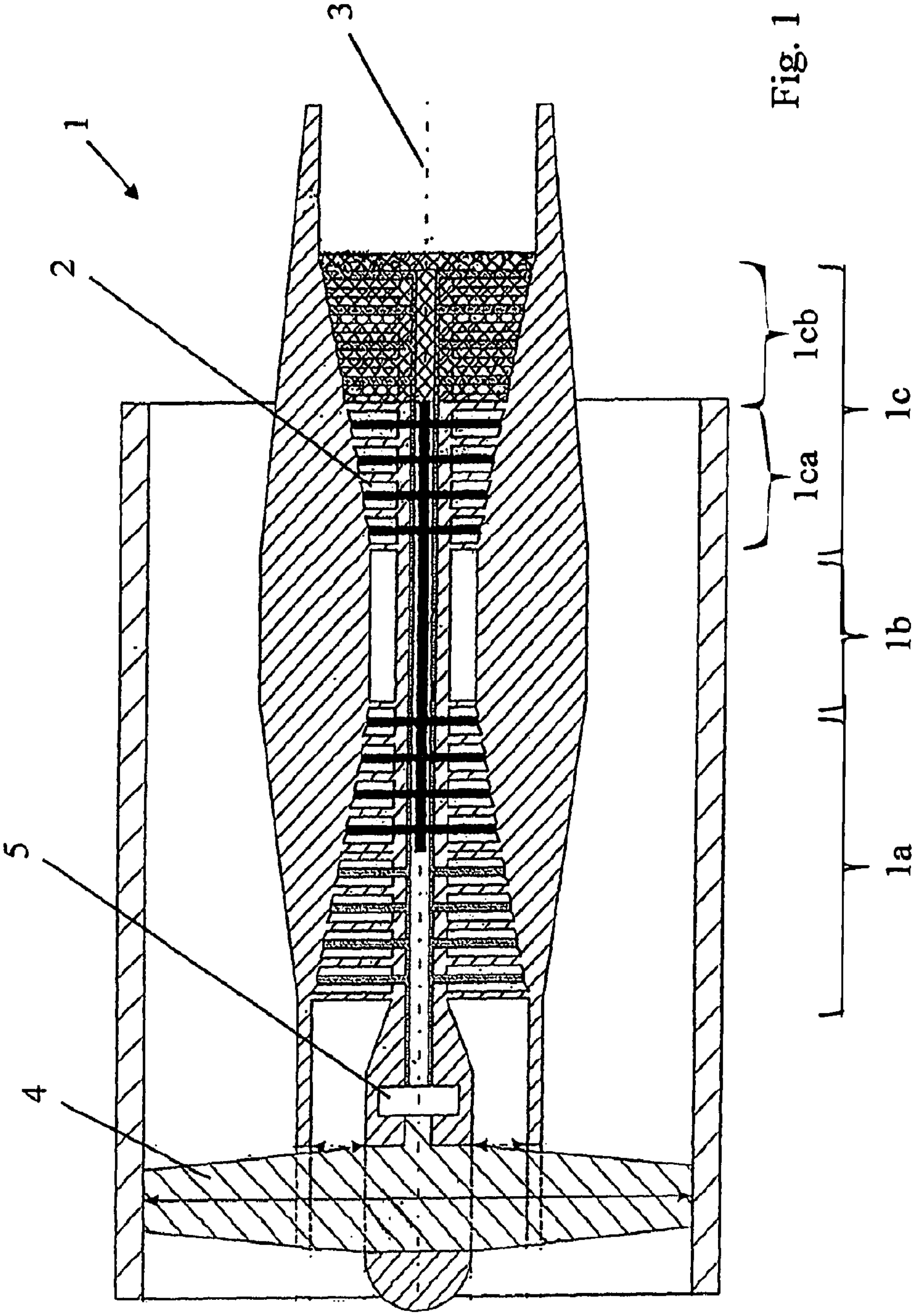
FIG. 1 shows schematically a turbofan engine in an axial section.

FIG. 1 shows a turbomachine 1 in a schematic view, specifically a turbofan engine. The turbomachine 1 is subdivided functionally into a compressor 1*a*, a combustion chamber 1*b* and a turbine 1*c*, the latter having a high-pressure turbine module 1*ca* and a low-pressure turbine module 1*cb*. In this case, both the compressor 1*a* and the turbine 1*c* are composed of a plurality of stages, each stage being composed of a guide vane ring and a rotor blade ring. In relation to the flow around them in the gas duct 2, the rotor blade ring is arranged downstream of the guide vane ring in each stage. During operation, the rotor blades rotate about the longitudinal axis 3. The fan 4 is coupled via a transmission 5, and the rotor blade rings of the low-pressure turbine module 1*cb* rotate faster than the fan 4 during operation.

Figure 2:
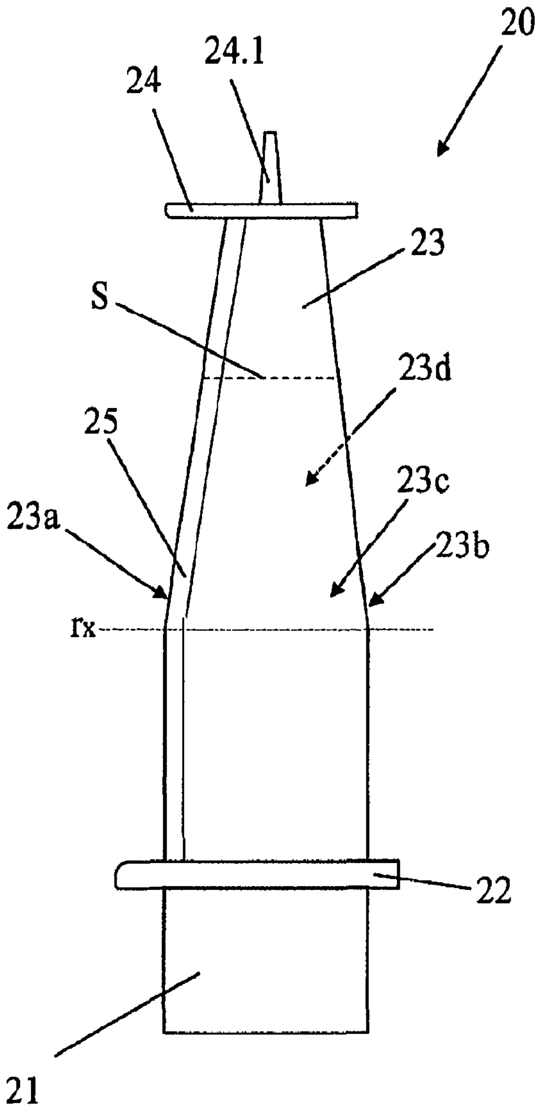
FIG. 2 shows schematically a rotor blade of the engine according to FIG. 1 in a side view.

FIG. 2 shows a rotor blade 20 in a schematic side view, namely a rotor blade 20 of a rotor blade ring of the turbine 1*c*, specifically of the low-pressure turbine module 1*cb*. The rotor blade has a blade root 21, which has no further relevance in the present case, and an inner platform 22 radially to the outside of it. The airfoil 23 extends radially outward from the inner platform 22. Arranged at the radially outer end of the airfoil 23 is an outer shroud 24, which has exactly one sealing fin 24.1. This is advantageous with regard to the weight and hence the edge load, cf. the introduction to the description for more detail.

In relation to the flow around it in the hot-gas duct, the airfoil 23 has a leading edge 23*a*, a trailing edge 23*b*, and two side faces 23*c,d*, which each connect the leading edge 23*a* and the trailing edge 23*b* to one another. One of the side faces 23*c,d* forms the suction side of the rotor blade 20, the other the pressure side. At the leading edge 23*a*, the rotor blade 20 is provided with a coating 25 for protection against impact damage, said coating being composed of a metallic layer and a ceramic layer arranged thereon (the layers are not shown in detail). From the illustration according to FIG. 2, it can furthermore be seen that the schematically shown chord length S decreases radially outwardly away from a radial position $r_x$, which likewise reduces the edge load. The chord length S remains constant or even decreases slightly inwardly from the radial position $r_x$, cf. FIG. 4.

Figure 3:
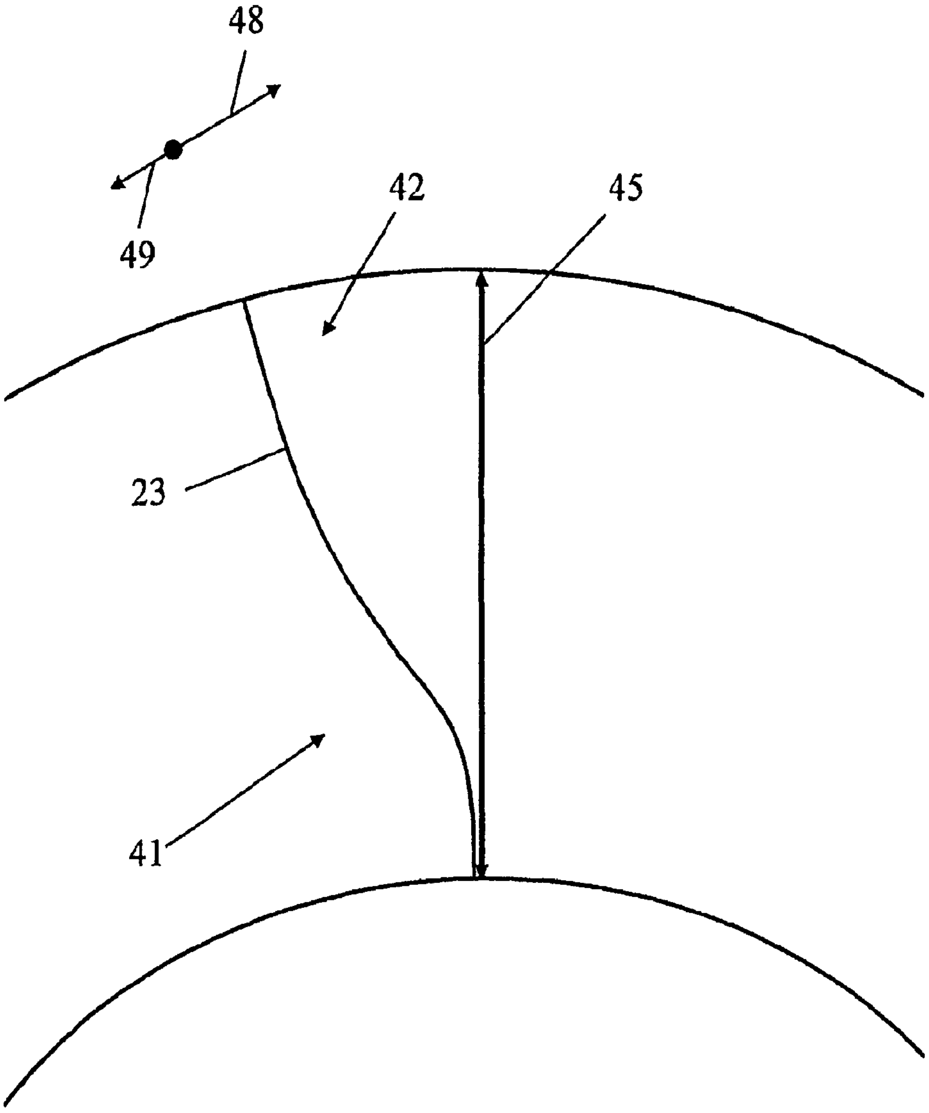
FIG. 3 shows the rotor blade according to FIG. 2 in an axial view.

FIG. 3 shows the rotor blade airfoil 23 schematically in an axial view, which illustrates the slope of the rotor blade airfoil 23. In the illustration, the suction side 41 is on the left of the rotor blade airfoil 23, and the pressure side 42 is on the right. The rotor blade airfoil 23 slopes toward the suction side 41, specifically radially in the center with respect to the rotor blade airfoil height 45. Radially on the inside and radially on the outside, the slope is less steep, and the rotor blade airfoil 23 can also run into the hub or the casing without any slope at all. In this context, the slope toward the suction side 41 is set in such a way that the centrifugal-force bending moment 46 acting on the rotor blade airfoil 23 during operation is greater than the gas-force bending moment 47. As a result, the rotor blade airfoil 23 is bent toward the pressure side 42, which reduces the load there and thus the susceptibility to impact at the leading edge 23*a*, cf. also the introduction to the description.

Figure 4:
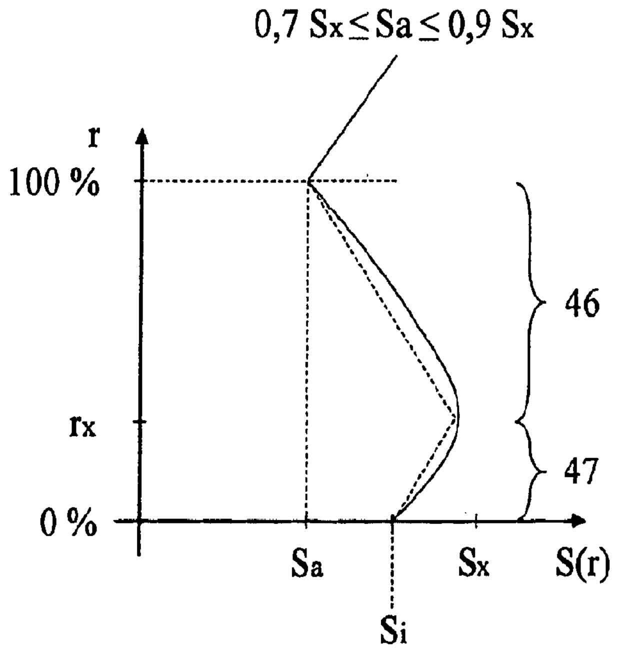
FIG. 4 shows the relationship between the chord length S and the radius r.

FIG. 4 illustrates the relationship between the chord length S and the radius r, given as a percentage of the radial rotor blade airfoil height. Radially inwardly, the airfoil has the chord length $S_i$ and, radially outwardly, it has the chord length $S_a$. In a radial position $r_x$ inbetween, it has the chord length $S_x$ (which in the present case represents a maximum). The radial position $r_x$ is between 20% and 50% of the radial rotor blade airfoil height.

In the radially outer section 46, that is to say radially outwardly from the radial position $r_x$, the chord length S decreases. This reduces the edge load and thus increases the impact tolerance in this region. Radially outwardly, the chord length $S_a$ is 0.7 to 0.9 times the chord length S.

In the radially inner section 47, the chord length S does not decrease radially outwardly. It may either be constant (not illustrated) or, as shown in FIG. 4, it may even slightly increase outwardly, that is to say decrease inwardly away from the radial position r. The chord length $S_i$ radially inwardly is 0.9 to 1 times the chord length $S_x$. The inventors have observed that overall there are nevertheless no losses in robustness, cf. the introduction to the description for more detail. On the other hand, limiting the chord lengths radially inwardly permits an axially more compact construction, which may be advantageous, for example, with regard to weight and efficiency.

Figure 5:
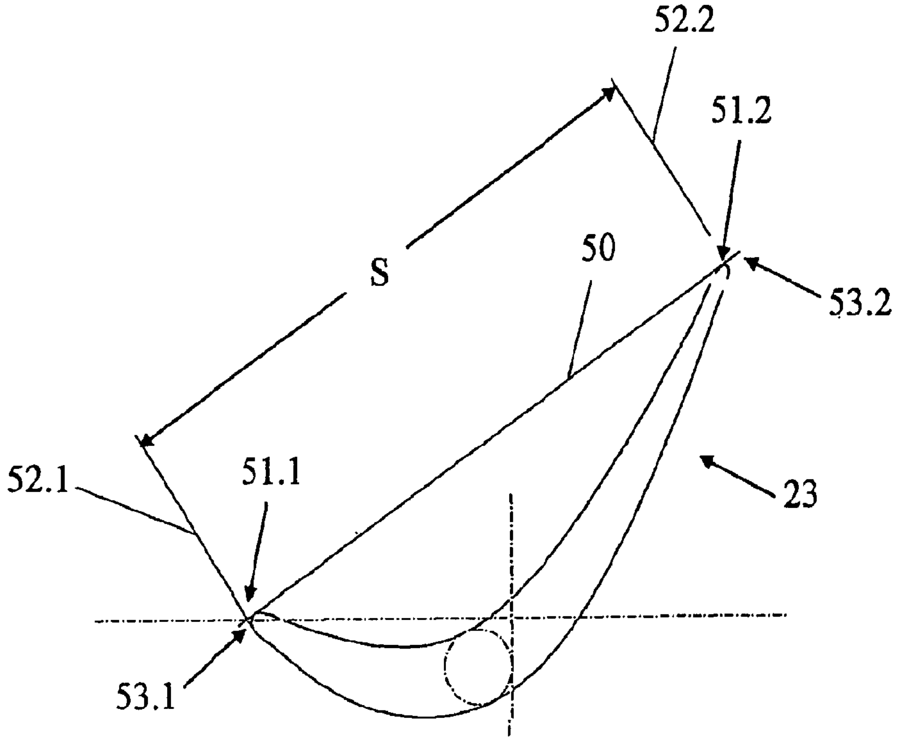
FIG. 5 shows the determination of the chord length S on a cross-sectional profile.

FIG. 5 illustrates the airfoil 23 in a tangential section. The chord length S is taken along a connecting tangent 50, which is placed against the profile on the pressure side and has a contact point 51.1 axially at the front and a contact point 51.2 axially at the rear on the profile. The chord length S is then taken between two further tangents 52.1, 52.2, which are each perpendicular to the connecting tangent 50, tangent 52.1 having a contact point 53.1 axially at the front and tangent 52.2 having a contact point 53.2 axially at the rear.

LIST OF REFERENCE SIGNS

| | |
|---|---|
| turbomachine | 1 |
| compressor | 1a |
| combustion chamber | 1b |
| turbine | 1c |
| high-pressure turbine module | 1ca |
| low-pressure turbine module | 1cb |
| gas duct | 2 |
| longitudinal axis | 3 |
| fan | 4 |
| transmission | 5 |
| rotor blade | 20 |
| blade root | 21 |
| inner platform | 22 |
| airfoil | 23 |
| leading edge | 23a |
| trailing edge | 23b |
| side faces | 23c, d |
| outer shroud | 24 |
| sealing fin | 24.1 |
| coating | 25 |
| chord length | 26 |
| profile surface | 27 |
| suction side | 41 |
| pressure side | 42 |
| rotor blade airfoil height | 45 |
| outer section | 46 |
| inner section | 47 |
| centrifugal-force bending moment | 48 |
| gas-force bending moment | 49 |
| connecting tangent | 50 |
| front contact point | 51.1 |
| rear contact point | 51.2 |
| further tangents | 52.1, 52.2 |
| contact points | 53.1, 53.2 |

What is claimed is:

1. A rotor blade wherein the rotor blade is configured and arranged in a gas duct of a turbomachine and comprises a rotor blade airfoil wherein the rotor blade has a blade root, an inner shroud, and an outer shroud, radially inwardly has a chord length $S_i$, the chord length $S_i$ being taken in a tangential section directly above the blade root or the inner shroud, radially outwardly has a chord length $S_a$, the chord length $S_a$ being a tangential section directly below the outer shroud, and, a radial position $r_x$, between radial positions of the tangential sections of the chord length $S_i$ and the chord length $S_a$, has a chord length $S_x$, the chord length $S_x$ in the radial position $r_x$ being greater than or equal to the chord length $S_i$ radially inwardly ($S_i \leq S_x$), and the chord length $S_a$ radially outwardly being less than or equal to 0.9 times the chord length $S_x$ in the radial position $r_x$ ($S_a \leq 0.9\ S_x$).

2. The rotor blade of claim 1, wherein in relation to a rotor blade airfoil height taken from radially inside to radially outside, the radial position $r_x$ with the chord length $S_x$ is at least 20% and at most 50% of the rotor blade airfoil height.

3. The rotor blade of claim 1, wherein the chord length $S_i$ radially inwardly corresponds to at least 0.9 times the chord length $S_x$ ($S_i \geq 0.9\ S_x$).

4. The rotor blade of claim 3, wherein a radial progression of a chord length S(r) radially inwardly from the radial position $r_x$ shows a monotonic decrease from $S_x$ to $S_i$.

5. The rotor blade of claim 4, wherein a radial progression of a chord length S(r) radially outwardly from the radial position $r_x$ shows a monotonic decrease from $S_x$ to $S_a$.

6. The rotor blade of claim 3, wherein the chord length $S_a$ radially outwardly corresponds to at least 0.7 times the chord length $S_x$ ($S_a \geq 0.7\ S_x$).

7. The rotor blade of claim 6, wherein a radial progression of a chord length S(r) radially outwardly from the radial position $r_x$ shows a monotonic decrease from $S_x$ to $S_a$.

8. The rotor blade of claim 1, wherein the chord length $S_a$ radially outwardly corresponds to at least 0.7 times the chord length $S_x$ ($S_a \geq 0.7\ S_x$).

9. The rotor blade of claim 1, wherein a radial progression of a chord length S(r) radially outwardly from the radial position $r_x$ shows a monotonic decrease from $S_x$ to $S_a$.

10. The rotor blade of claim 9, wherein the monotonic decrease is strictly monotonic and follows a constant slope.

11. The rotor blade of claim 1, wherein the chord length $S_x$ is greater than the chord length $S_i$ ($S_i < S_x$) and a radial progression of a chord length S(r) radially inwardly from the radial position $r_x$ shows a monotonic decrease from $S_x$ to $S_i$.

12. The rotor blade of claim 11, wherein the monotonic decrease is strictly monotonic and follows a constant slope.

13. The rotor blade of claim 1, wherein, in relation to a radial height of the rotor blade airfoil, the rotor blade airfoil is provided, at least in a section or sections, with a slope toward a suction side of the rotor blade airfoil, wherein the slope is configured and arranged so that a centrifugal-force bending moment, which the centrifugal force brings about on the rotor blade airfoil as a result of the slope, is greater than a gas-force bending moment which acts on the rotor blade airfoil as a result of a flow around the rotor blade airfoil.

14. The rotor blade of claim 1, wherein the rotor blade comprises the outer shroud arranged radially outwardly on the rotor blade airfoil, a single sealing fin being arranged radially outwardly on the outer shroud.

15. The rotor blade of claim 1, wherein at least the rotor blade airfoil is made of a high-temperature-resistant material.

16. The rotor blade of claim 15, wherein the high-temperature-resistant material comprises a titanium aluminide.

17. The rotor blade of claim 15, wherein the high-temperature-resistant material comprises a TNM (titanium niobium molybdenum) alloy.

18. The rotor blade of claim 1, wherein the rotor blade airfoil is provided with a coating at least at a leading edge of the rotor blade airfoil.

19. The rotor blade of claim 18, wherein the coating is a multilayer coating.

20. A turbine module for an aircraft engine, wherein the module comprises the rotor blade of claim 1.

* * * * *